United States Patent [19]

Offner

[11] 4,101,827
[45] Jul. 18, 1978

[54] METHOD AND APPARATUS FOR DETERMINING THE LOCATION OF A LEAK IN A PIPE BURIED UNDERGROUND

[76] Inventor: Franklin F. Offner, 1890 Telegraph Rd., Bannockburn, Deerfield, Ill. 60015

[21] Appl. No.: 751,891

[22] Filed: Dec. 17, 1976

[51] Int. Cl.² .......................................... G01R 27/02
[52] U.S. Cl. .................................... 324/65 R; 324/64; 340/605
[58] Field of Search .................. 324/65 P, 52, 65 R, 324/64; 340/242; 73/73; 200/61.05, DIG. 40

[56] References Cited

U.S. PATENT DOCUMENTS

| | | | |
|---|---|---|---|
| 1,719,786 | 7/1929 | Schlumberger | 324/64 X |
| 1,895,643 | 1/1933 | Putnam | 324/64 |
| 2,123,545 | 7/1938 | Pearson | 324/64 X |
| 2,172,778 | 9/1939 | Taylor, Jr. | 324/65 P |
| 2,440,044 | 4/1948 | Greenslade | 324/64 |
| 2,694,179 | 11/1954 | Walstrom | 324/65 R X |
| 2,802,173 | 8/1957 | Nisle | 324/64 X |
| 2,974,276 | 3/1961 | Davis | 324/65 R X |
| 3,548,304 | 12/1970 | Lohnes | 324/65 R |
| 3,721,970 | 3/1973 | Niemoth | 324/65 R |

FOREIGN PATENT DOCUMENTS 1,548,167   4/1970   Fed. Rep. of Germany ..... 324/65 R Primary Examiner—Stanley T. Krawczewicz
Attorney, Agent, or Firm—Burns, Doane, Swecker & Mathis

[57] ABSTRACT

The location of one or more leaks in a pipe made from an electrically insulating material and which is buried in an electrically conductive medium, typically a pipe buried underground, is determined by filling the pipe with an electrically conductive fluid, e.g. tap water, passing an electrical current through the fluid in such manner as to establish a voltage gradient along the length of the fluid in the pipe and then analyzing the gradient to determine the location of the leak. In one embodiment, the bared end of an insulated conductor connected to one terminal of a voltmeter, the other terminal being grounded, is drawn through the pipe to measure the gradient. In another embodiment, a voltage source is connected to the fluid at opposite ends of the pipe to establish a voltage gradient for the distance between those ends, the voltage drop between the fluid at one end of the pipe and ground is measured and the distance from that end of the pipe to the leak point is determined by the relationship between these two voltages and distances.

10 Claims, 4 Drawing Figures

METHOD AND APPARATUS FOR DETERMINING THE LOCATION OF A LEAK IN A PIPE BURIED UNDERGROUND

BACKGROUND OF THE INVENTION

This invention relates to an improved electrical method and apparatus for determining the location of a leak in a pipe buried in the ground and is applicable to any type of pipe or tube which is made of an electrically insulating material. Such pipes are widely used, for example, in connection with swimming pool installations, irrigation systems, gas lines, and also conduits for carrying electrical wires for telephone and power purposes. Commonly employed electrically insulating materials for such pipes, tubes, and conduits have been polyethelene and polyvinyl chloride (PVC), but the method and apparatus is usable with pipes, tubes, and conduits of other electrical insulating materials as well.

In the past several methods have been employed when a leak is known to occur in an underground pipe, especially those used for conducting water. One such method is to inject a radioactive material in the fluid, and subsequently wash out the fluid containing the radioactivity. Some radioactivity will remain in the ground in the vicinity of the leak. By the use of a radioactivity detector such as a Geiger counter, the region of radioactivity can often be found, thus localizing the region of the leak. The accuracy of localization is however not high, due to the spread of radioactivity, and the difficulty of finding the point of maximum activity. Further, the method is restricted to pipes which are not buried at large distances from the surface as the radioactivity at the surface will be reduced, and spread in area. Also special health safeguards are required when using radioactive substances.

Another method employed is to force water into the pipe under pressure, and to listen for the sound of the water forced through the leak. This method while useful in detecting the general region of a leak, is not very precise.

The advantages of my improved electrical method are that it gives a precise distance for the location of the leak, employs no substances which could be harmful to health, and is simple to employ.

SUMMARY OF THE INVENTION

The basic novelty involved in determining the location of one or more leaks in a pipe made of an electrically insulating material and which is buried in a medium which is electrically conductive, typically a pipe buried underground, resides in the steps of at least partially filling the pipe with a fluid, e.g., tap water, which is electrically conductive, passing an electrical current through the fluid in such manner as to establish at least one voltage gradient along the length of the fluid in the pipe and then analyzing the gradient to determine the location of the leak.

In accordance with one mode, a voltage source preferably a.c., although d.c. can be used, is connected between the ground and an electrode which is immersed in the fluid at one end of the pipe which results in a current flow from the fluid in the pipe through the leak point into the ground which establishes a voltage gradient along the fluid in the pipe between the electrode and the leak point. One terminal of a voltmeter is connected to the ground and the other terminal is connected to the bared end of an insulated conductor which is then drawn through the pipe to measure the voltage gradient.

The leak point is determined from analysis of the gradient and the position of the bared end of the conductor in the pipe.

In accordance with another mode, a voltage source $V_1$ is connected to the fluid at opposite ends of the pipe to establish a voltage gradient along it for the distance $d_2$ between the pipe ends, the voltage drop $V_2$ between the fluid at one end of the pipe and the ground is measured and the distance $d_1$ from that end of the pipe to the leak point is established by the relationship $d_1/d_2 = V_1/V_2$.

BRIEF DESCRIPTION OF THE DRAWINGS

The method in accordance with the invention and apparatus by which it can be performed are illustrated in the accompanying drawings wherein.

DETAILED DESCRIPTION OF PREFERRED EMBODIMENTS

Figure 1:
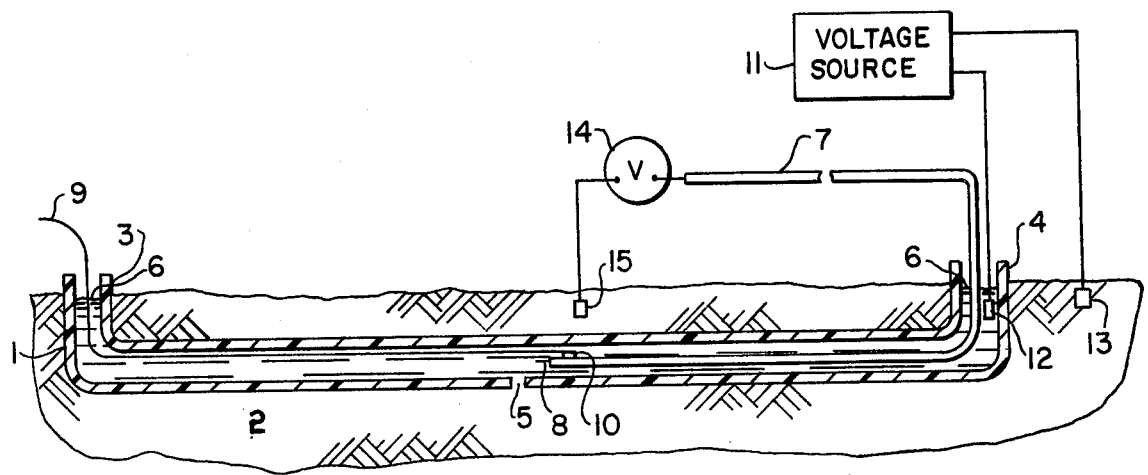
FIG. 1 is a schematic view illustrating one suitable electrical apparatus by which the method can be practiced, and wherein the situs of the leak in the pipe is located by passing the bare end of an otherwise insulated wire through the pipe from one end thereof.

With reference now to FIG. 1, a pipe 1 made of electrically insulating material, such as one of the materials previously mentioned to be tested for leaks and the location thereof, is illustrated as being buried in the ground 2. The ends of this particular pipe turn upward at 3 and 4 which emerge above ground, thus facilitating testing. However, should this not be the case, the ends of the pipe are made available by some practical means. In the present illustration, the pipe has a leak underground at a location indicated by numeral 5.

In order to localize the leak point 5, the pipe is partially filled with an electrically conducting liquid, which may conveniently be ordinary tap water; the pipe is shown filled to a level indicated by numeral 6. An electrically conducting wire 7 which is completely insulated except for a tip 8 at one end which acts as a probe is passed into the pipe. This can be accomplished conveniently, for example, by first passing a light weight cord 9 through the pipe. The latter can be done by sucking water through the pipe by attaching a pump at end 4, and flowing water through the pipe from 3 to 4, carrying cord 9 with it. The pump is then removed, and cord 9 tied to wire 7 at point 10 just to the rear of the probe end 8. Cord 9 is then pulled back through the pipe pulling the wire 7 with it.

A voltage source 11 is electrically connected to one electrode 12 which is immersed in the liquid at pipe end 4, and to a second electrode 13 which is driven into the ground, or otherwise arranged to make a good electrical contact with the ground. In this manner an electrical potential difference is created between the liquid in pipe end 4 and the ground. Thus an electrical current will flow from the liquid into the ground through the leak at point 5 in the pipe.

As a result of this current flow, a potential drop will be created along the liquid in the pipe between electrode 12 and 5, the point of the leak. This potential drop can be measured, for example, by connecting a voltage measuring instrument 14 to the opposite end of wire 7 and to ground through electrode 15. This latter electrode is usually preferably separate from electrode 13 so as to avoid errors due to any potential difference existing between electrode 13 and ground due to current flow. However a common electrode may be used.

To use the method for determining the situs of leak 5, the voltage registered on the instrument 14 is noted as the probe end 8 of wire 7 is pulled through the pipe at fixed increments. If the pipe is of uniform cross-sectional area, the voltage will decrease uniformly with distance as the probe end 8 approaches the point of leak 5. When the probe end 8 is closest to leak point 5, the voltage observed on instrument 14 will fall to its minimum value, if there is only one leak point 5 in the pipe, and the voltage will remain at this minimum value as the wire is pulled further into the pipe.

Thus to measure the exact distance of the leak point 5 from one end of the pipe, it is only necessary to measure the length of wire 7 which has entered the pipe, up to the point of minimum voltage.

Figure 3:
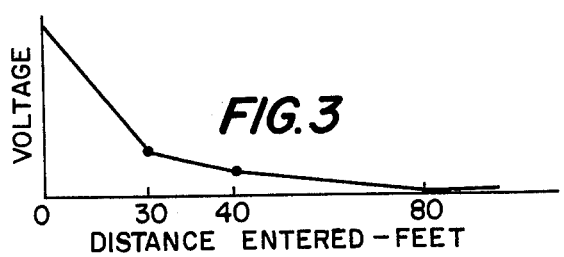
FIG. 3 is a plot showing variations in voltage readings on the wire passed into the pipe in accordance with the apparatus illustrated in FIG. 1 in a situation where the pipe contains a multiplicity of leaks along it.

If there are two leaks in the pipe at different distances from the end, it will be found that the voltage registered on instrument 14 will decrease at a constant rate until the probe end 8 of wire 7 is at the leak closest to the end where electrode 12 is introduced (this need not be the end where wire 7 is inserted). Thereafter, as the wire is pulled further through the pipe, the voltage registered will fall at a lower rate with distance, falling to its lowest value at the second leak, and will remain at this low value thereafter. The relative rates at which the voltage falls as the first leak is approached and passed will depend upon the relative magnitudes of the two leaks. Three and more leaks may be similarly found and localized, by finding succeeding points at which the slope of the voltage vs. length of entry curve changes. Thus in FIG. 3 is shown a plot of voltage vs. distance such as might be obtained with leaks in the pipe at distances of 30, 40, and 80 feet from the end of the pipe.

Figure 2:
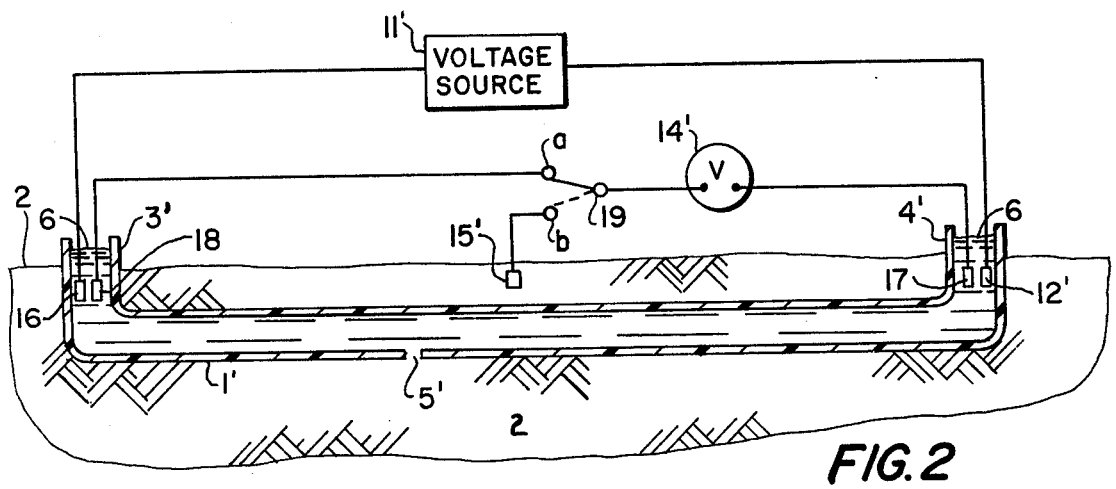
FIG. 2 is also a schematic view similar to FIG. 1 and wherein the situs of the leak in the pipe is located by the introduction of wires into only the end portions of the pipe.

The principle involved in operation of the modification illustrated in FIG. 2 is basically the same as that in FIG. 1 in that a voltage drop is established along the length of the liquid in the pipe indicative of the location of the leak. The embodiment of FIG. 2, while having the advantage over that of FIG. 1 of not requiring a wire to be inserted along the length of the pipe, is limited to applications in which there is only one leak in the pipe to be tested. Preferably, also, the pipe should be of substantially uniform diameter for use of this method.

More particularly, as shown in FIG. 2, the voltage source 11' is connected, as in FIG. 1, to an electrode 12' making contact with the liquid at one end of pipe 1'. The other output terminal of voltage source 11' is connected to a second electrode 16 inserted in the opposite end of pipe, making contact with the liquid at that end. In this manner, a voltage drop is established along the length of the liquid in the pipe.

One terminal of the voltage measuring instrument 14' is now connected so as to measure the voltage difference between the liquid at one end of the pipe, as at end 4', preferably by contact to the liquid through a separate electrode 17 immersed in the liquid at pipe end 4'. However, in some applications it is permissible to employ a common electrode for connection to the voltage measuring instrument 14' and voltage source 11', but greater accuracy will usually be obtained by the use of separate electrodes. The other terminal of instrument 14' is connected to a switch 19, permitting the selection of the measurement of the total potential difference across the liquid in pipe 1', when switched to position $a$: or the potential between the liquid at pipe end 4' and ground, when switched to $b$. To accomplish this, switch terminal $a$ is connected to an electrode 18 inserted to make contact with the liquid in the pipe at end 3'; and terminal $b$ is connected to electrode 15', which is inserted into the ground. As before, terminal $a$ may alternatively be connected to electrode 16, with a possible reduction in accuracy.

To determine the location of the leak 5' in the pipe, switch 19 is first turned to terminal $a$, and the voltage measured on instrument 14'. Switch 19 is then turned to terminal $b$ and the voltage measured again. If the cross-sectional area of pipe 1' is uniform throughout, then the ratio between distance $d_1$ from the electrode at pipe end 4' to the point of leak 5' and the distance $d_2$ between the electrodes at the pipe ends 3' and 4' is equal to the ratio between the voltage $V_1$ measured at terminal $a$ and the voltage $V_2$ measured at terminal $b$. That is to say:

$$d_1/d_2 = V_1/V_2$$

from which the position of the leak can be immediately obtained.

In order to facilitate the location of the leak when using the method of FIG. 2, it is convenient to include in the voltage measuring instrument 14' a means for setting the reading on it to a determined value, such as 100 units on its measuring scale, when switch 19 is set at position $a$. Then the reading on the scale, when set at position $b$, is directly the percentage of the total pipe length (between liquid level at its two ends), from one end to the leak, assuming that the pipe is of uniform cross-sectional area.

Alternatively, the reading of 14' may be set to indicate the total distance between the electrodes at the two ends of the pipe, that is, $d_2$, when switch 19 is in position $a$. Then 14' will read the distance to the leak, $d_1$, when switch 19 is in position $b$, thus eliminating all calculation by the user.

It is, of course, possible to correct the distance so calculated for pipes of other than uniform cross-sectional area: the "equivalent length" of each portion of the pipe is its actual length times its cross-sectional area, and distances so calculated are used in applying the above equation to localize the leak.

Although ordinary tap water would usually be employed to fill the pipe or tube to be tested, other fluids having some electrical conductivity may be used. The conductivity should preferably not be too high, however. If it is very high an excessively large current would be required to obtain a readily measured voltage drop in the fluid and voltage drop in the ground around the leak could prevent the attainment of a sharp minimum at the point of the leak, or a sharp break in the curve of voltage vs. distance, in the event of several leaks, using the method of FIG. 1. On the other hand the resistance of the fluid must not be excessively high, to avoid the need for a very high sensitivity in the voltage measuring instrument 14, and especially to avoid possible spurious signals due to leakage currents.

The voltage source 11 may be either one giving a direct current (D.C.) voltage, or an alternating current (A.C.) voltage. The voltage measuring instrument 14, which must then be made to respond to D.C. or A.C. signals, as the case may be, must have a high input impedance, so that in measuring the signal voltage it draws very little current from the electrodes which are in contact with the liquid in the pipe. This is especially important if the liquid used has a relatively high resistance. It will usually be advisable to employ a voltage measuring instrument of the electronically amplified type, to insure a sufficiently high input impedance.

The use of a D.C. signal source has the disadvantage that spurious polarization voltages can be generated at the electrodes. Such errors can be especially important in the method of FIG. 2, since the voltage value enters directly into the calculation of distance. However, by the use of suitable nonpolarizable electrodes the errors so introduced can be minimized.

The use of an A.C. signal source at 11 eliminates polarization errors. However, the frequency used must be low enough that the current flowing from the fluid through the pipe wall into the ground, due to capacitance, is not excessive. Such current flow will give substantial errors particularly with the method of FIG. 2. However, using fluids of normal conductance, such as tap water, A.C. signals of up to several hundred hz. frequency may be used, for normal pipes up to several hundred feet in length.

Figure 4:
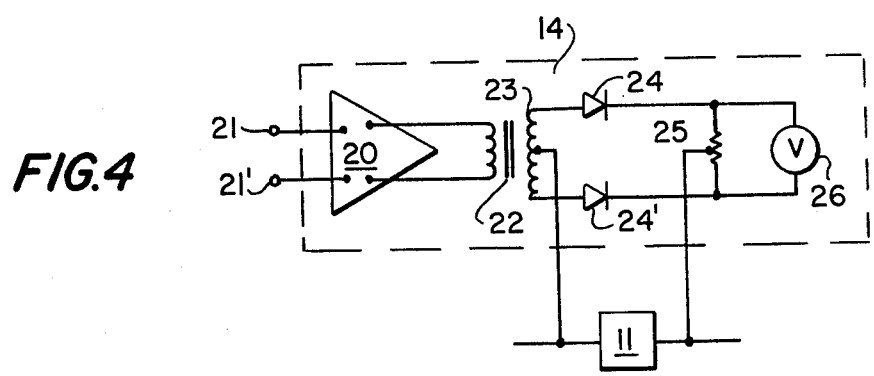
FIG. 4 illustrates schematically a frequency-selective voltage measuring instrument, useful with the method.

Using A.C. signals, it is possible to introduce errors due to A.C. currents flowing through the ground from other sources, such as leaky power equipment. To avoid this, it is sometimes advisable to use a frequency other than that used for power transmission (60 hz in the United States), for the signal source 11. Then voltage measuring means 14 should include a frequency selective means, so that its reading will not be affected by signals of frequency other than that of source 11. Such frequency selective means may consist of an inductance capacitance filter of conventional type; or it may consist of a phase sensitive detector, as for example of the type shown in FIG. 4. Here 14 includes an electronic amplifier 20 having two input terminals 21,21'. The output of 20 is applied to the primary of transformer 22, which has a center-tapped secondary 23. The output of the secondary is applied through diodes 24, 24' to center-tapped resistor 25. A direct voltage measuring instrument 26 is connected across 25. Signal voltage from source 11 is connected between the centers of 23, 25. This type of measuring instrument will only give a steady output reading on 26 due to input signals applied to terminals 21,21', having exactly the same frequency as that of source 11.

In the foregoing, and in the appended claims, it must be understood that by the term "buried" is included a pipe immersed or encased in any medium, including water or concrete, the requirement being that the medium have some electrical conductivity; and by the term "ground" is to be understood that medium.

I claim:

1. The method for determining the location of a leak in a pipe made of an electrically insulating material which is buried in a medium that is electrically conductive which comprises the steps of:
   at least partially filling the pipe with a fluid that is electrically conductive,
   passing an electrical current through the fluid in said pipe;
   measuring the electrical potential between said fluid and the medium in which said pipe is buried, and ascertaining the location of the leak from the measured potential.

2. The method for determining the location of a leak in a pipe made of an electrically insulating material which is buried in a medium that is electrically conductive which comprises the steps of:
   at least partially filling the pipe with a fluid that is electrically conductive,
   establishing a voltage difference between the fluid in said pipe and said electrically conductive medium to establish a voltage gradient along the fluid, and
   measuring the voltage incrementally along the gradient until a point where said gradient substantially changes in value is reached and which latter indicates the location of a leak.

3. The method for determining the location of a leak in a pipe made of an electrically insulating material which is buried in a medium that is electrically conductive which comprises the steps of:
   at least partially filling the pipe with a fluid that is electrically conductive,
   effecting a flow of electrical current through the fluid along the pipe and which establishes a corresponding voltage gradient, and
   deriving the location of said leak by determination of the voltage drop across said fluid which occurs between a known point in the fluid and the medium in which said pipe is buried.

4. The method for determining the location of a leak in a pipe made of an electrically insulating material which is buried in a medium that is electrically conductive which comprises the steps of:
   at least partially filling the pipe with a fluid that is electrically conductive,
   applying a voltage between the fluid at one end of the pipe and said medium in which said pipe is buried thereby to effect a flow of electrical current through said fluid from said pipe end to the leak point and establish a voltage gradient therealong, and
   measuring the voltage along said gradient in an incremental manner until a point where said gradient substantially changes in value is reached and which thereby is indicative of the leak point.

5. The method for determining the location of a leak in a pipe made of an electrically insulating material which is buried in medium that is electrically conductive which comprises the steps of:
   at least partially filling the pipe with a fluid that is electrically conductive,
   applying a voltage between the fluid at one end of the pipe and said medium in which said pipe is buried thereby to effect a flow of electrical current through said fluid from said pipe end to the leak point and establish a voltage gradient therealong, and
   moving a voltage measuring probe through the fluid from one end until a point where said gradient substantially changes in voltage is reached and which thereby indicates a leak point in said pipe.

6. The method for determining the location of a leak in a pipe made of an electrically insulating material which is buried in a medium that is electrically conductive which comprises the steps of:
   at least partially filling the pipe between the ends thereof with a fluid that is electrically conductive, applying a voltage $V_1$ to the fluid at the opposite ends of said pipe thus to effect a flow of electrical current through the fluid and establish a voltage gradient therealong for the distance $d_2$ between the pipe ends, measuring the voltage drop $V_2$ between the fluid at one end of said pipe and the medium in which said pipe is buried, and determining distance of $d_1$ from said one end of said pipe to the leak point from the relationship $$d_1 d_2 = V_1/V_2.$$

7. The method of determining the location of a plurality of leaks in a pipe made of electrically insulating material which is buried in a medium which is electrically conductive, which comprises the steps of:

at least partially filling the pipe with a fluid that is electrically conductive, applying a voltage between the fluid at one end of the pipe and said medium in which said pipe is buried thereby to effect a flow of electrical current through said fluid from said pipe end to said medium through the plurality of leak points, and thus to establish voltage gradients along the fluid in said pipe, and measuring the voltage along said gradients in an incremental manner, thus determining the points at which changes in said gradients occur and which is thereby indicative of the various points of leak.

8. Means for determining the distance along an insulating pipe at which a leak or leaks to ground occurs, including an insulated flexible wire which may be inserted into one end of said pipe, said wire having a portion of each end electrically exposed, a first electrode immersed in conducting fluid at least partially filling said pipe, a second electrode connected to ground, a source of voltage connected between said first and second electrodes, a voltage measuring means, connected to measure the voltage between said wire and ground, and means for passing said wire in incremental and known distances through said pipe.

9. Means for determining the position in a buried insulating pipe at which a leak to ground occurs, including, a source of voltage, a first and second electrode connected to said source, said electrodes being immersed in electrically conductive fluid at least partially filling said pipe, respectively at the two ends of said pipe, thus producing a voltage gradient through said fluid, voltage measuring means connected to alternatively measure the total voltage difference across the fluid at the two ends of said pipe, and the voltage between the fluid at one end of said pipe and ground, thus permitting determination of the position of a leak.

10. Means as described in claim 9, which further includes adjusting means so that said measuring means may read the position of the leak directly.

* * * * *